July 24, 1956     R. GUILLEMINOT ET AL     2,755,923
PACKAGE OF BOTTLES

Filed Aug. 5, 1953     3 Sheets-Sheet 1

INVENTORS
ROGER GUILLEMINOT &
DESIRE CAELIER

By Young, Emery & Thompson
ATTYS.

July 24, 1956  R. GUILLEMINOT ET AL  2,755,923
PACKAGE OF BOTTLES
Filed Aug. 5, 1953  3 Sheets-Sheet 2

INVENTORS
ROGER GUILLEMINOT &
DESIRE CARLIER

By Young, Emery & Thompson
ATTYS

July 24, 1956  R. GUILLEMINOT ET AL  2,755,923
PACKAGE OF BOTTLES
Filed Aug. 5, 1953  3 Sheets-Sheet 3

INVENTORS
ROGER GUILLEMINOT &
DESIRE CARLIER
BY Young, Emery & Thompson
ATTYS.

United States Patent Office 2,755,923
Patented July 24, 1956

2,755,923
PACKAGE OF BOTTLES

Roger Guilleminot, Paris, and Désiré Carlier, Calonne-Ricouard, France

Application August 5, 1953, Serial No. 372,549

Claims priority, application France August 12, 1952

9 Claims. (Cl. 206—65)

The present invention has for its object a method for handling bottles, flasks and the like containers made of glass, earthenware or the like material.

Generally, when it was required to store bottles after manufacture and to allow their subsequent rehandling for loading them on railroad carriages or on trucks and for unloading them at the point of use, the handling was performed by hand. The bottles were positioned one by one in superposed, juxtaposed and staggered formation. This handling requires a considerable amount of hands and submits the latter to heavy work.

Another conventional manner of handling bottles, chiefly for delivering them when full and returning them when empty, consists in laying them in boxes or crates adapted to receive a predetermined number of bottles. But this manner of proceeding requires a stock of crates or boxes, and the filling of the latter is performed, of necessity, by hand. The cost of transportation is increased by the cost of the crates or boxes.

The present invention has for its object a method for handling bottles, whereby the drawbacks of the prior handling methods are cut out while the storing, transportation and unloading of the bottles may be performed in a more speedy and convenient manner, possibly with the assistance of mechanical means, so as to do away with a large fraction of the labor required hitherto.

The method according to the invention consists in producing bundles of bottles constituted by two stacks arranged side by side, the necks of the bottles in one stack being inserted in the spaces left free between the necks of the bottles in the other stack and the two stacks being held together to form a unit by means of a bond engaging directly the bottles. The binding is advantageously obtained by bonds encircling the two stacks, which primary bonds are interconnected by means of transverse auxiliary bonds extending in a direction perpendicular to that of the encircling bonds.

However, when the shape of the bottle allows such an arrangement, the transverse bond or bonds may be omitted. Each stack is then bound both in register with the bodies of the bottles forming it and in register with the necks of the cooperating stack.

It might be assumed, at first sight, that the bundles or packages of bottles thus constituted cannot have the desired rigidity and resistance, as required during handling and that the bottles have a tendency to slide and roll over one another so that the bundles or packages would be immediately dislocated under the action of fortuitous causes, such as a slight shock. Now, experience shows that this is not to be feared and that the bundles of bottles bound together as disclosed, can be submitted to conventional handling without any dislocation. When the binding is finished, the bottles arranged in staggered formation form a rigid and stable package which is handled as easily as a casing or crate by means of the usual hoisting devices, such as elevator carriages for instance.

In order to ensure a still higher stability, it is of advantage in certain cases, to provide for the medial bottles of each stack which are not in direct contact with the bonds, retaining the means as obtained e. g. by the insertion of a frictional part made of paper, cardboard or the like material between said medial bottles and the peripheral bottles, so as to substitute for the contact between glass surfaces, a contact between glass and paper or the like material.

According to another method, there may be inserted along the medial bottles e. g. a rigid wire the inturned ends of which bear against the bottoms of two associated medial bottles facing each other.

The packages or bundles of assembled and bound bottles may include a variable number of bottles according to the nature, size and weight of the latter. Preferably, this number is selected so that the package may assume a shape furthering the handling operation such as storing and loading, preferably a parallelopipedic shape. In this case, the bundle may be constituted by two interengaging stacks comprising each four, nine or possibly sixteen bottles. In the case of bottles of conventional type, bundles of eighteen bottles constituted by two associated stacks of nine bottles each, are of particular advantage.

The binding of the bundles is ensured through any suitable binding members such as steel wire, metal strips, strips or threads of plastic material and the like. This use of galvanized iron wire is of advantage when the bundles are to be stored for some length of time in moist premises.

The binding is readily performed through mechanical means.

Accompanying drawings show by way of example various embodiments of the invention. In said drawings.

Figure 1:
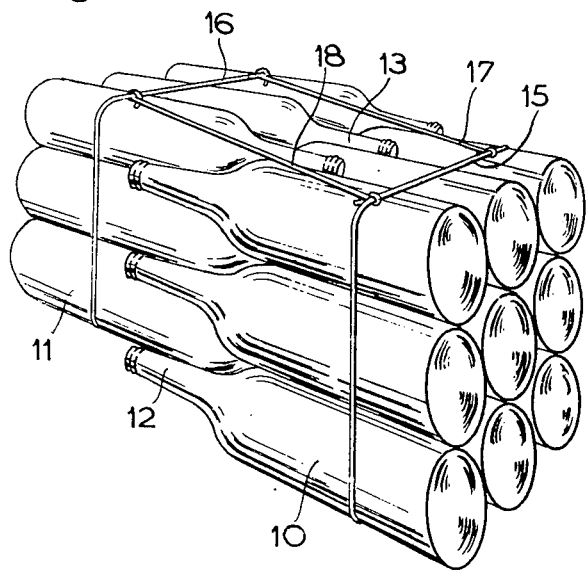
Fig. 1 illustrates a bundle of assembled and bound bottles in perspective view.
Figure 3:
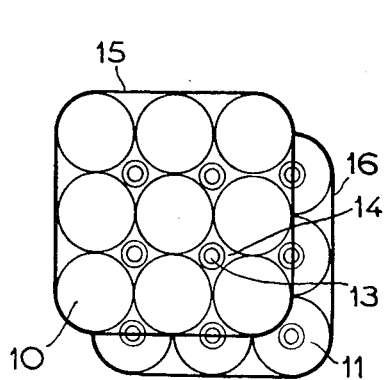
Fig. 3 is an end view thereof.
Figure 2:
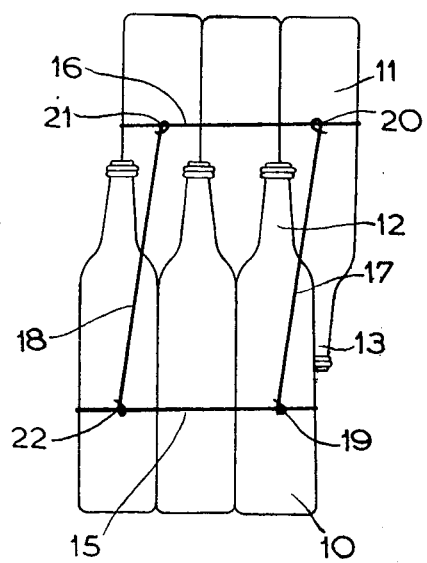
Fig. 2 is a plan view of the same bundle.

As illustrated in Figs. 1 to 3, the bottles to be handled are arranged side by side to form two stacks 10 and 11. Each stack includes three superposed layers of three juxtaposed bottles. The necks 12 of the bottles in the stack 10 are inserted in the intervals 14 between the bottles of the stack 11; conversely, the necks 13 of the bottles of the stack 11 are inserted in the intervals between the bottles of the stack 10.

The system of eighteen bottles thus interengaging one another, is bound by suitable means such as iron wires 15, 16, each of said wires encircling the corresponding stack 10 or 11. These two encircling wires 15 and 16 are then interconnected by transverse bonds 17 and 18.

A convenient manner of executing said binding consists in forming the bond 17 by means of the end of the encircling wire 15; said encircling wire is twisted and secured at its end 19 and is then extended along the line 17 up to the opposite encircling wire 16 to which it is engaged at 20 by hooking. Similarly, the wire 18 forms the end of the encircling wire 16 beyond which it projects at 21 so as to be hooked at 22 into the opposite encircling wire 15.

The double stack of bottles 10 and 11 may easily be bound by hand with conventional tools. It may also be bound mechanically. Furthermore, the binding system constituted by the encircling wires 15 and 16 and by the transverse bonds 17 and 18 may be prepared beforehand and then fitted over and secured to the system of assembled bottles. Such operations may be readily performed by automatically operating mechanisms.

Figure 4:
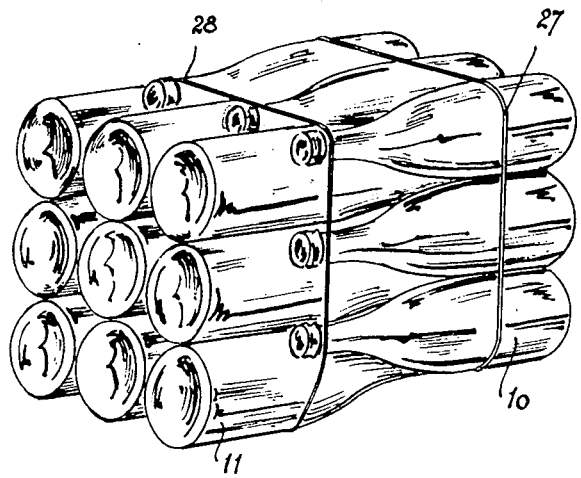
Fig. 4 illustrates a further arrangement for the bundle of assembled and bound bottles.

Fig. 4 illustrates a further manner of producing a bundle of eighteen bottles which are in this case of the type generally used for wines such as Champagne, Burgundy, Alsace or Rhinewine etc. The connection between the two stacks 10 and 11 is ensured by the two peripheral bonds 27 and 28, of which the former is fitted over both the bodies of the bottles in the stacks 10 and the necks in the stack 11 while, similarly and symmetrically, the bond 28 is fitted over the bodies of the bottles in the stack 11 and the necks in the stack 10. It is apparent that, by reason of their location, the bonds 27 and 28 increased the rigidity of the assembly between the two stacks.

The bonds 27 and 28 may be connected together by a transverse binding member the presence of which is, however, not always necessary nor even useful.

Similarly, the omission of the transverse bond 17 or 18 in Fig. 1 or 2 is often not at all detrimental to the stability of the bundle during transportation.

Figure 5:
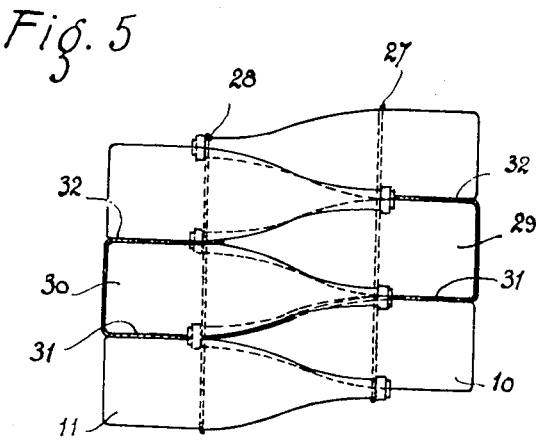
Fig. 5 is a longitudinal sectional view of a bundle of bottles as illustrated in Fig. 4 incorporating means for holding the medial bottles in each stack.
Figure 6:
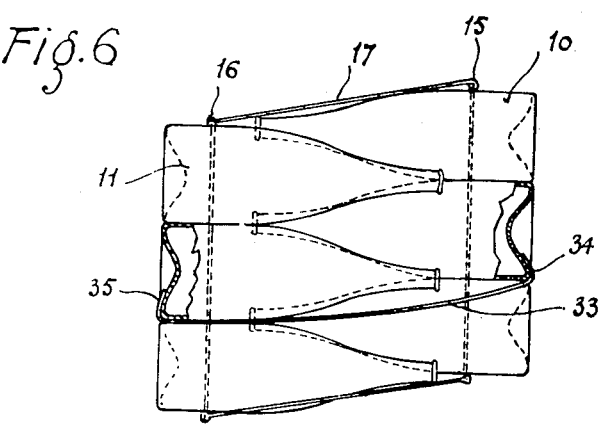
Fig. 6 illustrates a further bottle-holding arrangement as applied to a bundle according to Fig. 1.

Considering Figs. 5 and 6, they are cross-sections of the bundle of bottles in a broken sequence of planes passing through the axes of the medial bottles in both stacks 10 and 11. Said Figs. 5 and 6 shows the means which serve for opposing any possible sliding of said medial bottles in each stack. In Fig. 5, there is shown a sheet of paper or thin cardboard 31 inserted during the execution of the bundle underneath the medial bottles 29 and 30. Thus, the contact between said bottle 29 or 30 and the outer bottles of the stack 10 or 11, is no longer a contact between glass surfaces but a contact between glass and paper or cardboard.

This sheet inserted underneath the system of bottles 29 and 30 assumes preferably a length such that its ends may be folded back so as to be fitted between the medial bottles 29 and 30 and the upper outer bottles of the stack 10 and 11 respectively.

Instead of a single strip of cardboard or paper inserted between the bottles so as to produce the increase frictional action as desired for both medial bottles 29 and 30, it is possible to provide two separate strips enclosing the bottom of the corresponding bottle after folding over same. It is also possible to position the separate elements surrounding a medial bottle without folding them back over the bottom of said bottle.

A further manner of holding the medial bottles 29 and 30 is illustrated in Fig. 6, according to which the free space underneath the bottles is engaged by a wire 33 the inturned ends 34 and 35 of which bear against the bottoms of the bottles 29 and 30 or are fitted inside the concave bottoms of Champagne or the like bottles provided with such concave bottoms when such bottles are being packaged.

Obviously, the arrangements of Figs. 5 and 6 are applicable in the execution of the bundles of Figs. 1 and 4, if required.

Figure 7:
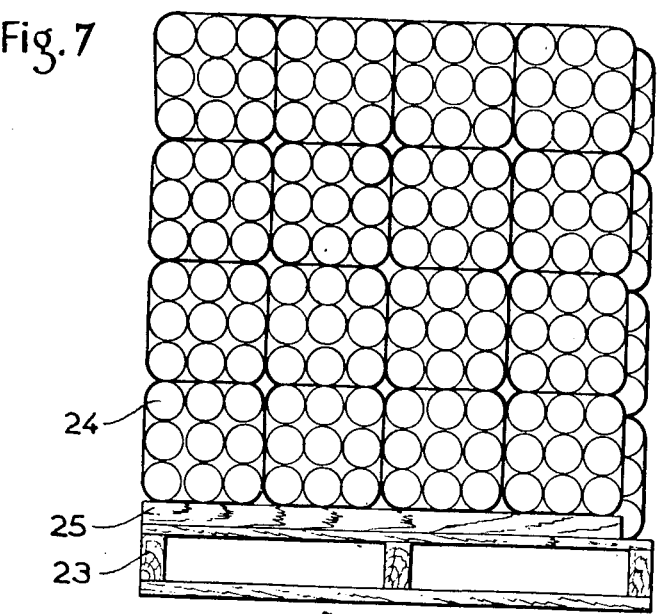
Fig. 7 shows in side view the stacking of a system of bundles on a carrier board before the loading of said bundles on an elevator carriage.
Figure 8:
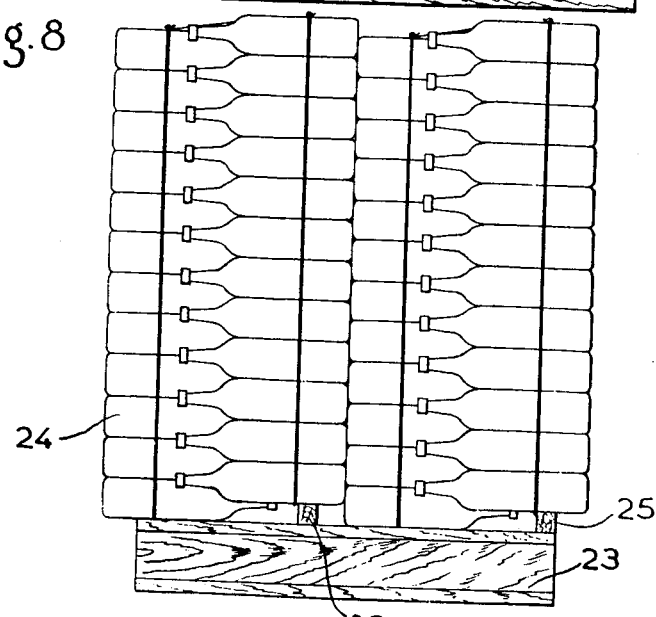
Fig. 8 is a lateral elevational view of the compound stack of Fig. 7.
Figure 9:
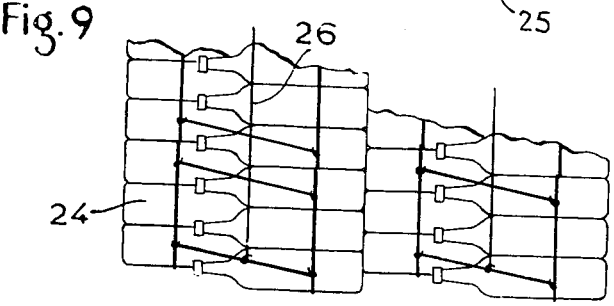
Fig. 9 is a partial plan view of the compound stack shown in Figs. 7 and 8.

The bundles executed as disclosed are quite rigid and may be submitted to all usual handling methods which even much less fragile packages undergo. Thus, it is possible to pile up the bundles or packages on carrier boards 23 of the type generally provided when handling goods through the agency of elevator carriages (Figs. 7 to 9).

In this case, the packages or bundles 24 of empty bottles, such as illustrated in Fig. 1, are piled up over a carrier board 23. Preferably, shims 25 are removably or permanently secured underneath the lower bundles so as to make up for the vertical staggering between the bottles of one primary stack and the other in the same package, as readily apparent from inspection of Fig. 8. It is thus easy to load a stack of bundles 24 in the same manner as if they were boxes, and said stacks are thus transported bodily in a single operation.

Furthermore, it is possible to provide for stability of the stacks by means of a bond such as 26 connected with the transverse bonds of the two terminal bundles or packages of a given row of packages.

As apparent, it is possible to provide, on a carrier board of standard size, for the bodily transportation of 32 to 75 bundles of eighteen bottles, i. e. 576 to 1350 bottles, according to the size of the latter.

This association of bundles such as 24 allows executing speedily with a reduced number of men and without any strain for the latter, the piling-up and the loading of the bottles before shipment. Obviously, the bundles 24 are adapted to be handled by any hoisting or transportation means, but even when handled without any such mechanical means, the bundles as described further operation considerably and in particular, at the delivery, they allow a very easy loading and setting in order. The use of such bundles cuts out all unused dead spaces and prevents the collapsing of the stacks into freely rolling or sliding bottles.

This manner of handling bundles of bottles shows considerable advantage of speed and economy over the usual manner of proceeding. While the loading of a car or truck in accordance with prior methods requires four men's work for four hours, this is performed, when resorting to packages prepared in accordance with the invention, in only one hour and a half, by only two persons who have, in fact, a very easy work to execute.

In the preceding disclosure, the handling method has been described chiefly for the case of empty bottles assumed to be coming out of glassworks. Obviously, the method is readily applicable to the handling of filled bottles as well.

It should be remarked that the improved method described is clearly distinct from the well known packaging method according to which the bottles, whether empty or otherwise, are laid in position in interengaging relationship inside a box or crate that is outwardly hooped. The difference consists in that, according to the invention, the binding is executed directly over the bottles and that the crate or box is done away with.

What we claim is:

1. A package of bottles for storage and handling, comprising a plurality of bottles positioned in contact with each other in two imbricated piles, the necks of a portion of the bottles of one pile extending into the free spaces between the bottles of the other pile, transverse banding means surrounding and tightly binding each pile of bottles and means securing the banding means of the two piles together longitudinally of the bottles.

2. A package of bottles for storage and handling according to claim 1, in which the bottles are arranged in a contiguous manner and further comprising means on the central bottles of the two piles for retaining the bottles against longitudinal movement.

3. A package of bottles for storage and handling according to claim 2, in which the means on the central bottle of each pile comprises a sheet of cardboard arranged between the central bottles of each pile and the outside bottles of the said pile.

4. A package of bottles for storage and handling according to claim 1, in which the bottles are arranged in a contiguous manner and further comprising a sheet of cardboard arranged between the central bottles of each pile and the outside bottles of said pile.

5. A package of bottles as claimed in claim 4, in which the sheet of cardboard associated with the central bottles of the two piles is folded back over the base of the said central bottles.

6. A package of bottles for storage and handling, comprising a plurality of bottles positioned in contact with each other in two imbricated piles, the necks of a portion of the bottles of one pile extending into the free spaces between the bottles of the other pile, transverse banding means surrounding and tightly binding each pile of bottles, and means securing the banding means of the two piles together longitudinally of the bottles, including at least one longitudinal connection attached to the said banding means.

7. A package of bottles for storage and handling, comprising a plurality of bottles positioned in contact with each other in two imbricated piles, the necks of a portion of the bottles of one pile extending into the free spaces between the bottles of the other pile, transverse banding means surrounding and tightly binding each pile of bottles, each banding means passing over the body of the bottles of the one pile and over the necks of the outside bottles of the other pile.

8. A package of bottles for storage and handling, comprising a plurality of bottles positioned in a contiguous manner in two imbricated piles, the necks of a portion of the bottles of one pile extending in the spaces between the bottles of the other pile, a metallic wire positioned along the length of the central bottles of the two piles and having its extremities turned back and supported by the bases of the said central bottles, transverse banding means surrounding and tightly binding each pile of bottles, and means securing the banding means of the two piles together longitudinally of the bottles.

9. A package of bottles for storage and handling, comprising eighteen bottles positioned in contact with each other in two piles, each comprising nine imbricated bottles, the necks of the bottles of one pile extending into the free spaces between the bottles of the other pile, transverse banding means surrounding and tightly binding each pile of bottles, and means securing the banding means of the two piles together longitudinally of the bottles.

References Cited in the file of this patent

UNITED STATES PATENTS 2,100,035     Merrick _____ Nov. 23, 1937

FOREIGN PATENTS 486,957     Great Britain _____ June 13, 1938